Figure 1:
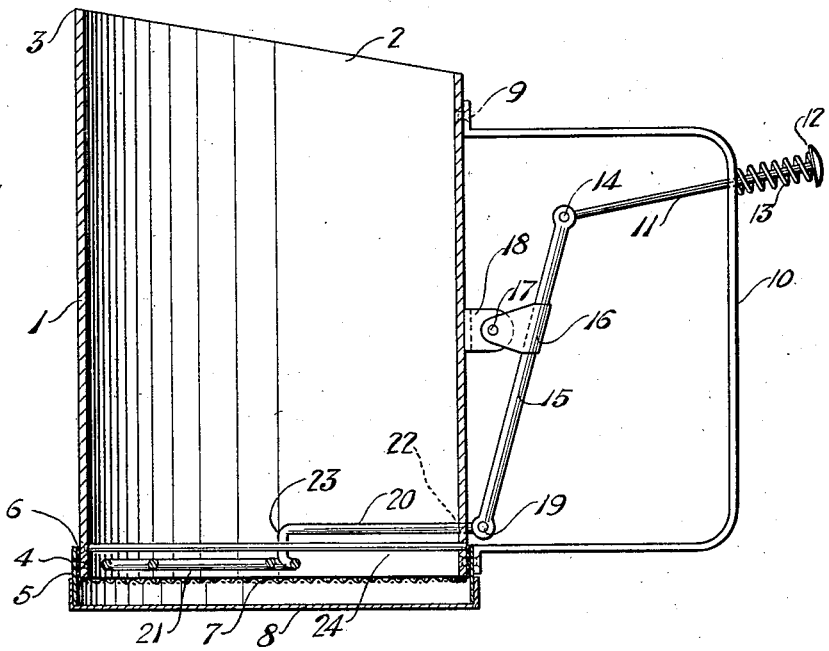

F. LEHRMANN.
SIFTER.
APPLICATION FILED MAR. 30, 1911.

1,011,822.

Patented Dec. 12, 1911.

WITNESSES:
J. R. Mahoney
R. H. Butler

INVENTOR.
F. LEHRMANN.
BY
ATTORNEYS.

UNITED STATES PATENT OFFICE.

FREDERICK LEHRMANN, OF TURTLE CREEK, PENNSYLVANIA.

SIFTER.

1,011,822.  Specification of Letters Patent.  Patented Dec. 12, 1911.

Application filed March 30, 1911. Serial No. 617,932.

*To all whom it may concern:*

Be it known that I, FREDERICK LEHRMANN, a citizen of the United States of America, residing at Turtle Creek, in the county of Allegheny and State of Pennsylvania, have invented certain new and useful Improvements in Sifters, of which the following is a specification, reference being had therein to the accompanying drawing.

This invention relates to sifters, and the primary object of my invention is to provide a culinary utensil that can be advantageously used for sifting flour and powdered matter, without resorting to the use of both hands to properly hold and operate the sifter.

A further object of the invention is to provide a sifter with a reciprocatory agitator for agitating the contents of the sifter and cause the same to pass through a screen at the bottom of the sifter.

I attain the above objects by a mechanical construction that is simple, durable, free from injury by ordinary use, easy to manipulate and maintain in a sanitary condition, and highly efficient for the purposes for which it is intended.

The invention will be hereinafter specifically described and then claimed, and reference will now be had to the drawing, wherein:—

Figure 2:
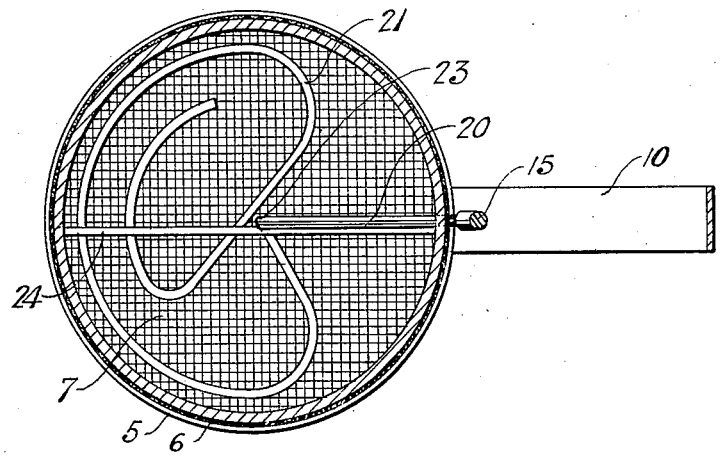

Figure 1 is a vertical sectional view of the sifter, and Fig. 2 is a horizontal sectional view of the same.

A sifter in accordance with this invention comprises a cylindrical metallic shell 1 having the upper end thereof beveled, as at 2 to provide a pouring spout or outlet 3.

Riveted or otherwise connected to the lower edges of the shell 1, as at 4 is a band 5 and interposed between said band and the lower edges of the shell are the edges 6 of a horizontal screen 7, preferably made of a fine mesh of wire. The band 5 extends below the lower edges of the shell 1 to provide a rim adapted to receive a flanged lid 8, for closing the bottom of the sifter when desired. The lid 8 can be held by friction or any suitable hold-fast device.

Riveted or otherwise connected, as at 9 to the shell 1 is a C-shaped handle 10 and slidably mounted in the vertical portion of said handle is an actuating rod 11 having a button or knob 12. Encircling the actuating rod 11 between the handle 10 and the button 12 is a coiled compression spring 13. The inner end of the rod 11 is pivotally connected, as at 14 to a fulcrumed lever 15, said lever having a strap 16 pivotally connected, as at 17 to a bearing 18, carried by the shell 1. The bearing 18 is soldered or otherwise connected to the outer side of the shell 1. By this particular way of mounting the lever 15, the fulcrum for pivot point is so located as to permit the lever to swing bodily about said pivot. The lower end of the fulcrumed lever 15 is pivotally connected, as at 19 to the rear end 20 of an agitator 21, said agitator being preferably made of a piece of wire bent to provide a semi-circular looped formation extending over approximately half the area of the screen 7. The end 20 of the agitator 21 extends through an opening 22 provided therefor in the shell 1 and the agitator 21 is in a plane below the end 20 of said agitator, whereby the vertical portion 23 of the agitator can ride against the guide rod 24 arranged in the shell 1 above the screen 7. By reason of the particular mounting of the lever 15, the rods 11 and 20 may be connected to the lever with fixed pivot points without affecting the reciprocating movements of the agitator to any material degree, thus dispensing with the use of slotted connections which tend to not only affect the operation of the device, but permit the parts to move freely in undesired directions. Furthermore, this particular construction enables the operating parts to be located within the planes of the handle and therefore in a position where the handle tends to protect them against damage. By holding the handle 10 with the fingers of the hand, the thumb can be used for reciprocating the actuating rod 11, and as this rod is actuated, the lever 15 is rocked upon its fulcrum to reciprocate the agitator 21 above the screen 7 of the sifter. The contents of the sifter will be sufficiently stirred and agitated to prevent clogging and will therefore pass through the screen 7.

When the lid 8 is applied to the bottom of the sifter, it can be used as a scoop for handling flour, feed or other matter.

The sifter in its entirety is made of light and durable non-corrosive metal, and while in the drawing there is illustrated a preferred embodiment of the invention, it is to be understood that the structural elements thereof can be varied or changed, as to the size, shape and manner of assemblage without departing from the scope of the appended claims.

What I claim is:—

1. A sifter comprising a shell, a screen carried by the lower end of said shell, a handle secured to said shell, a lever fulcrumed upon said shell within said handle, the pivot point being positioned to permit the lever to swing bodily thereabout, an actuating rod pivotally connected to the upper end of said lever and extending through said handle, and an agitator arranged in said shell above said screen and having one end thereof extending through said shell and connected to said fulcrumed lever.

2. A sifter comprising a shell, a screen carried by the bottom thereof, a guide rod arranged in said shell above said screen, a reciprocatory agitator arranged between said guide rod and said screen and having the end thereof protruding from said shell, a handle carried by said shell, a lever fulcrumed upon said shell and pivotally connected to the end of said agitator, the pivot point of said lever being positioned to permit the latter to swing bodily about the pivot, and a spring pressed actuating rod movably mounted in said handle and pivotally connected to the upper end of said lever, said lever, actuating rod, and agitator being connected together with fixed pivot points.

In testimony whereof I affix my signature in the presence of two witnesses.

FREDERICK LEHRMANN.

Witnesses:
CHRISTINA T. HOOD,
MAX H. SROLOVITZ.

Copies of this patent may be obtained for five cents each, by addressing the "Commissioner of Patents, Washington, D. C."